United States Patent [19]

Bédard

[11] Patent Number: 5,135,205
[45] Date of Patent: Aug. 4, 1992

[54] RELEASED DOOR SUPPORTING AND STABILIZING TOOL

[76] Inventor: Francois Bédard, 640, McGregor Street, apt. 401, Sherbrooke, Province of Québec, Canada, J1L 1V7

[21] Appl. No.: 749,310

[22] Filed: Aug. 26, 1991

[51] Int. Cl.$^5$ .............................................. B23Q 3/00
[52] U.S. Cl. ....................................... 269/17; 269/71; 254/100
[58] Field of Search ................... 269/17, 296; 254/100, 254/134, 133, 89 R, 89 M, 2 R

[56] References Cited

U.S. PATENT DOCUMENTS

| | | | |
|---|---|---|---|
| 2,908,403 | 10/1959 | Browder et al. | 269/17 |
| 3,030,103 | 4/1962 | Allen et al. | |
| 3,059,785 | 10/1962 | Buckeye | |
| 3,850,409 | 11/1974 | Davis et al. | |
| 4,021,017 | 5/1977 | Adams | |
| 4,029,308 | 6/1977 | Mathers | |
| 4,180,252 | 12/1979 | Cushenbery | |
| 4,183,511 | 1/1980 | Marek | |
| 4,190,233 | 2/1980 | Godfrey | |
| 4,538,796 | 9/1985 | Steck | |
| 4,932,639 | 1/1990 | Fjellstrom | |

FOREIGN PATENT DOCUMENTS 1067110  11/1979  Canada .

Primary Examiner—Robert C. Watson
Attorney, Agent, or Firm—Pierre Lespérance; Francois Martineau

[57] ABSTRACT

A tool to assist a single worker of a car body reblocking workshop in installing a door or the like vehicle body part on a vehicle. The tool includes a wheeled base frame supporting three upright posts. Each vertical post carries a transverse horizontal arm. The two opposite end arms form support arms to support the bottom edge of the car door in upright position. The intermediate or body part stabilizing arm endwisely carries a discoid plate applied against the car body part, and from which project two opposite belts hooked at their outer ends to the opposite lateral side edges of the body part. Each support arm is controlled in elevation by an independent motor, while the stabilizing arm can be adjusted vertically and horizontally. Horizontal positioning is controlled along an azimuthal axis and can also pivot vertically. The present tool enables a single worker to support the door or other car body part at the required precise level and orientation both laterally and transversely for easy attachment to the door hinge parts of the vehicle chassis.

9 Claims, 3 Drawing Sheets

RELEASED DOOR SUPPORTING AND STABILIZING TOOL

FIELD OF THE INVENTION

The invention relates to tools used by workers in auto repair workshops, particularly for vehicle body repair shops.

BACKGROUND OF THE INVENTION

Mechanics working in repair shops for automobiles often need to disconnect body parts from the vehicle chassis in order to repair the released damaged body part and then to install this part. Handling in a safe way of the car released body part is usually a problem, in that, since these body parts may weight a hundred pounds or more, some sort of tool is needed to assist the mechanic in physically handling the car part. Moreover, during the process of release and reinstallation of the car part from the car chassis, it is critical not to damage the hinge mount or other securing means that secure the car part to the chassis. Indeed, accidental damage to the car part securing means can occur if no suitable weight support means for the released car part is provided.

U.S. Pat. No. 3,030,103 issued in 1962 to Special Products corp is typical of these tools for securing an automobile part in view of release thereof from a car chassis. A U-shape support 48-52 is mounted to a central upright post 32, whereby actuation of a winch handle 60 will bias U-support lengthwisely of standard 32. A bridging bar 92 is swivelled at the top of standard 32. Bar 92 will engage the inner surface of the car door to be released, for orienting the door properly and for providing lateral stabilization—against tilting—of the central part of the door when supported spacedly over ground by U-support 48-52.

A disadvantage of such a prior art door supporting tool is that, as for most of the prior art car part loading tools, at least two men are required to remove or install the car part to the car chassis. Another corollary disadvantage of prior art tools is that the time required to install or remove the car part with these tools takes on average half an hour with two men. The time and labour resource allocation is deemed inefficient.

U.S. Pat. No. 3,850,409 issued in 1974 to Davis and Jones, shows an improvement in which each of the laterally opposite, weight load support platform 22, 22 is vertically movable independently of one another via hydraulic means 10: upright cylinder 12 moving up and down axially of piston 18.

U.S. Pat. No. 4,029,308 issued in 1977 to Mathers shows an improvement in which a telescopic boom 20 pivotally carried at the top of the apparatus standard 18 is endwisely secured to the four edgewise sections of the hood part H via transverse hook members.

U.S. Pat. No. 4,183,511 issued in 1980 to Marek discloses an improvement whereby the car part tilt controlling means consists of two laterally spaced arms 146, 148 each having an endwise suction cup 150. The suction cup 150 temporarily secures the upper portion of the car part 12 to the apparatus, when supported over ground by the support bars 54, 56.

U.S. Pat. No. 4,932,639 issued in June 1990 to the Canadian corporation TAC Manufacturing, inc., is relevant in that it discloses as a car part tilt control means, a belt 26 having an end clasp 28 to be secured to the top edgewise portion of the vehicle part to be removed, while the bottom edgewise portion thereof is supported by a channel member 62 at the end of two horizontal telescopic boom support members 56. The portion of car door 16 intermediate anchor points 28 and 62 transversely abuts against a vertical bar 88 adjacent the main upright standard 82 of the car part holding apparatus.

OBJECTS OF THE INVENTION

The gist of the invention is thus to provide a tool for assisting mechanics in car repair workshops, wherein a single worker is needed to remove and/or install a car door or other car body part with said tool.

An additional object of the invention is to reduce the time required by a mechanics, when using the above-noted tool, to disengage a damaged car door from the car chassis, and to replace the repaired car door or a new door on the car chassis.

SUMMARY OF THE INVENTION

In accordance with the objects of the invention, there is disclosed a tool to assist a single car repair workshop worker to remove and install a door or the like vehicle body part from and on a damaged vehicle. The tool includes a wheeled base frame supporting three upright posts. Each vertical post carries a transverse horizontal arm. The two opposite end arms form support arms to support the bottom edge of a car door in upright position. The intermediate or door stabilizing arm is horizontally movable and endwisely carries an abutment plate applied against the door, and from which project two opposite belts hooked at their outer ends to the opposite side edges of the vehicle door. Each support arm is controlled in elevation by an independent motor, while the horizontal positioning of the stabilizing arm is controlled by an additional independent motor. Therefore, the door is adjustably supported in spatial oriented position and at the desired level.

More particularly, the invention concerns a tool for use in assisting a worker in a vehicle body reblocking workshop in the release and handling of a damaged body part from the vehicle chassis and in the installation of a body part, comprising: (a) a ground-movable planar wheeled base; (b) three upright posts upwardly projecting from said base and including first and second posts at the opposite ends thereof and a third intermediate telescopic post located therebetween; (c) first and second elongated support arms, endwisely connected to said first and second posts by first and second mounting means in substantially horizontal condition, for vertical displacement therealong under the action of independent first and second power means respectively; (d) a door stabilizing arm, carried at its inner end portion to the top end of said intermediate post by a third mounting means for horizontal positioning under the action of a third independent power means, with an abutment member being mounted to said stabilizing arm outer end for flat engagement of said abutment member against said car body part; and (e) a pair of flexible cables, anchored at their inner ends to said abutment member and releasably secured by hook members to the opposite lateral side edges of the car body part at their outer ends; wherein said support arms are adapted to support said body part by its bottom edge at an adjusted level and at an adjusted tilt in the plane of the body part, said stabilizing arm abutment member and said cables and associated hook members maintaining said body part at an adjusted tilt transversely of the car body part; wherein said tool is fully operable by a single person.

DETAILED DESCRIPTION OF THE INVENTION

Figure 1:
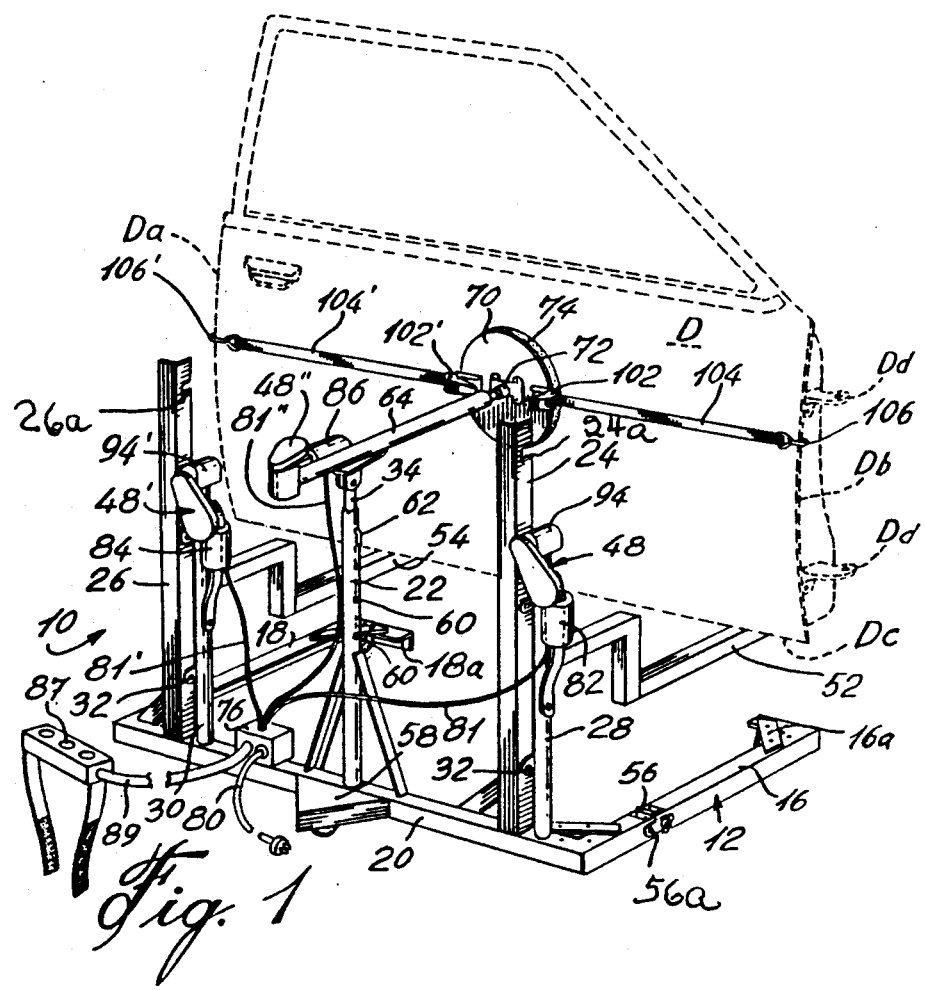
FIG. 1 is a perspective view of the vehicle door supporting tool, showing in phantom lines the door of an automobile released from its hinges and supported by the present tool.

Support apparatus 10 consists of a tubular ground frame 12 carried over ground by idle rollers 14. Tubular frame 12 may be generally U-shape, defining two free legs 16, 18 and a web leg 20 interconnecting the inner ends of legs 16, 18 integrally thereto. Idle rollers 14 are mounted at the free ends of each legs 16, 18 and at both ends of web 20. Web 20 itself supports three upright members: a central cylindrical telescopic standard post 22, and two rigid sturdy posts 24 and 26 at the opposite end portions thereof—posts 24 and 26 could be cross-sectionally L-shape as shown and are provided with three vertically spaced notches 24a, 26a; two cylindrical jacks 28, 30 are hooked to the posts 24, 26 respectively at any one of two levels by hooks 32 engaging the selected notches 24a, 26a.

Each jack 28 and 30 forms a hollow casing (FIG. 6) in which is rotatably mounted a screw 36 and 38 respectively. Each screw 36, 38 cannot move axially relative to its casing. Each screw 36, 38 carries a slider or nut block 40 defining an inwardly threaded bore 42 threadedly engaged thereon. Each cylindrical jack casing 28, 30 includes a lengthwise slit 44. An integral ear 46 dependent from each slider block 40 extends through each slit 44 outwardly therefrom, thus preventing rotation of each slider block 40 about corresponding screws 36 or 38 within jack casing 28 or 30. Drive means 48 rotates screw 36 or 38 to reciprocate slider 40 lengthwisely therealong.

A pivot mount 50 is provided at the outer end of each slider 40, for pivotally interconnecting two elongated support arms 52, 54 respectively to the corresponding slider, about a horizontal pivotal axis i.e. orthogonal to screws 36, 38 respectively. Each support arm 52, 54 is pivotable about its inner pivot mount 50 between a first limit position, extending substantially upright and parallel to their jacks 28, 30, and a second limit position, extending substantially horizontally.

Preferably, and viewed from the perspective of said second substantially horizontal position, each support arm 52, 54 defines an outer free end portion 52a, 54a (FIG. 5) which is downwardly offset from an inner end portion 52b, 54b, thus defining an intermediate vertical offset 52c, 54c. Outer arm portions 52a, 54a are adapted to support the bottom edge of a large vehicle body part, e.g. an automobile door D as illustrated in FIG. 1.

A rod 34 is axially slidable through central post 22, extending through and beyond the top mouth 22a of post 22. Tubular post 22 includes a number of lengthwisely spaced bores 60, and rod 34 has at least one transverse bore (not shown), wherein extension of rod 34 upwardly away from cylinder 22 is controlled by a pin 62 engaging a selected one of bores 60 and the transverse bore of rod 34. To the free end of rod 34 is pivotally mounted a transversely extending cylindrical load-stabilizing arm 64, about a pivot mount 66, for pivotal movement about a horizontal axis orthogonal to rod 34 as suggested in FIG. 5. Moreover, cylindrical arm 64 is hollow and rotatably carries a screw 36 which is axially restrained relative to arm 64. To pivot mount 66 is fixed an inwardly threaded slider block 40 threadably receiving screw 66 within arm 64. Arm 64 has a longitudinal slit 44 through which slider block 40 extends. Rotation of screw 36 by a driving means 48" mounted on arm 64 causes horizontal movement of arm 64 relative to pivot mount 66 as per the double arrow shown in FIG. 2.

Figure 6:
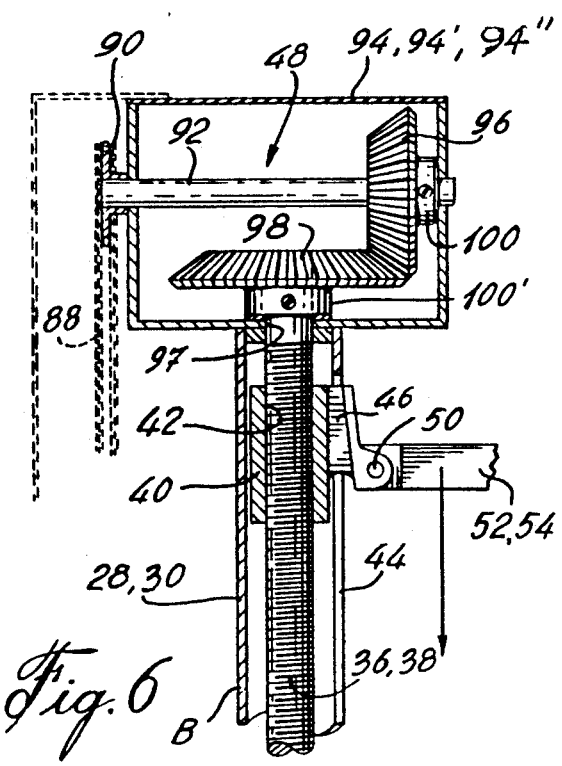
FIG. 6 is a longitudinal sectional view of the drive means for lifting the supporting arms.

From the foregoing, it is clear that arm 64 is a jack mechanism as in FIG. 6 but in which the relative movement is reversed.

Pivot mount 66 which corresponds to slider block 40 and its ear 46 of FIG. 6 is kept stationary and the arm 64 and its screw 36 is movable back and forth.

A stem 68 is fixed to the outer end of arm 64.

The pivotal axes of pivot mounts 50, 50 of support arms 52, 54 and that of pivot mount 66 of load or door stabilizing arm 64, are parallel to each other.

The free end of stem 68 is pivotally connected to a large disc plate 70 by a universal joint 72. Plate 70 comprises on its free surface—opposite joint 72—a shock dampening compressible material layer 74, e.g. made from a synthetic foam and having a concave outer face. Outer layer 74 is adapted to be compressed against a smooth rigid wall surface, such as a convex metallic car body part D as suggested in the figures.

Support arms 52, 54 and stabilizing arm 64 are each powered by three distinct drive means 48, 48', 48" which rotate their screws 36, 38. An electrical box 76—FIG. 1—carried by bar 20, is connected to a power source by electric line 80, and to three independent electrical motors 82, 84, 86, forming part of drive means 48, 48', 48", respectively, by electric lines 81, 81', 81". Each motor 82, 84, 86 is controlled independently of one another by switch means 87, itself connected to the control box 76 by remote control line 89. The box housing the switches 87 can be secured to the worker's thigh by the straps shown when seated in the car while installing door D. The height of support arm 52, controlled by motor 82, may be adjusted to be different from that of support arm 54, controlled by motor 84. Extension/retraction of door tilt control stabilizing arm 64 is controlled by motor 86.

Each motor 82-86 drives through a speed reducer a corresponding chain 88—FIG. 6. Chain 88 meshes with a gear 90 at one end of a short rotatable shaft 92, shaft 92 being rotatably mounted within a casing 94, 94', 94" respectively.

Each short shaft 92 of motors 82-86 extends endwisely spacedly and orthogonally to the screws 36, 38, respectively. Casings 94-94', 94" are fixed to one end of jack casings 28, 30 and arm 64. Screws 36, 38 extend through corresponding registering apertures 97 made in the adjacent wall of casings 94, 94', 94".

To shaft 92 is fixed a bevel gear 96 through its hub 100. To each screw 36, 38, is fixed a bevel gear wheel 98 through its hub 100' located within casing 94 and both gears mesh with each other.

Hence, actuation of electric motor 82-86 drives chain 88 to rotate shaft 92 via gear 90 and screws 36, 38 via right angle gears 96, 98, wherein support arms 52, 54 and discoid plate 70 are accordingly displaced in direct response therewith.

Figure 3:
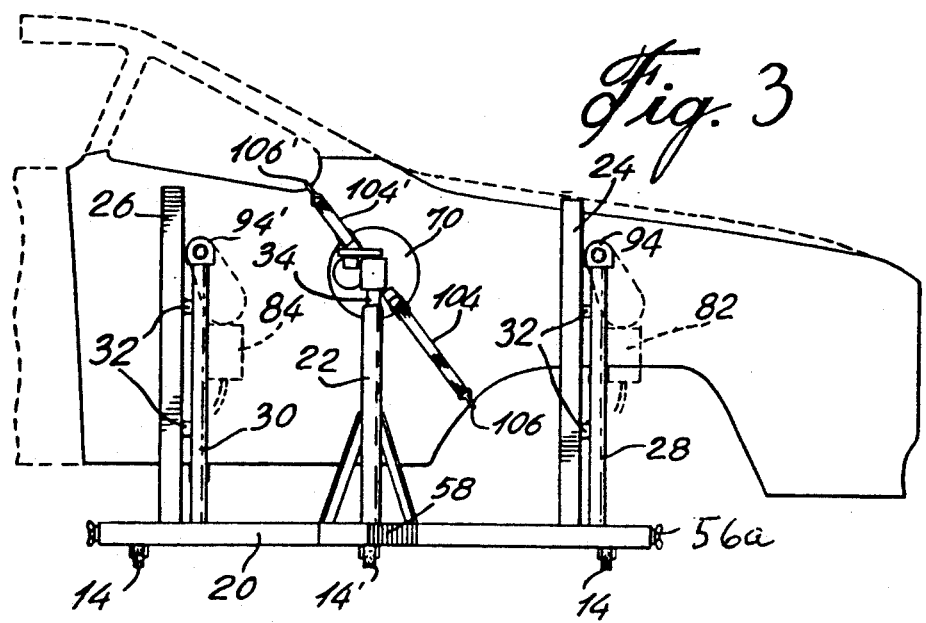
FIG. 3 is a side elevation at a reduced scale of a rear automobile body part, illustrating how the supporting tool of the invention can be mounted to a vehicle body part other than a door.

Radially opposite strap tighteners 102, 102' are mounted onto the inner face of plate 70—opposite the side of foam layer 74. Two flexible non-elastic straps 104, 104' are endwisely adjustably anchored by tighteners 102, 102'. To the free end of each strap 104, 104' is secured a hook or clasp 106, 106', for engaging opposite edgewise portions Da, Db, of an automobile door D or of another car body part as shown in FIG. 3. Tighteners 102, 102' have belt tensioning means of any known type, so as to adjust the length of straps 104, 104a as a function of the overall width of the car part D, whereby clasps 106, 106' may adequately secure said edgewise portions thereof Da. Db.

In a door removing or installing operation, tool 10 is moved toward or away from the vehicle rollingly on wheels 14. Projecting legs 16, 18 can engage freely under the vehicle and the arms 52, 54 under the opened car door D. Arm 64 can be manually pivoted downwardly or upwardly about the horizontal axis of pivot mount 66 (FIG. 5), to bring discoid plate 70 at the level of and against the intermediate height portion of door D. Straps 104, 104' are extended and belt tensioners, adjusted, to allow hooking engagement of clasps 106, 106' about door side edges Da, Db. Coarse vertical adjustment of each jack 28, 30 is effected using selected notches 24a, 26a of posts 24, 26, in accordance with the different levels of body parts such as doors found on different cars and trucks. Coarse vertical adjustment of arm 64 and pad 74 is obtained by adjusting the telescropic position of rod 34 in post 22.

Figure 4:
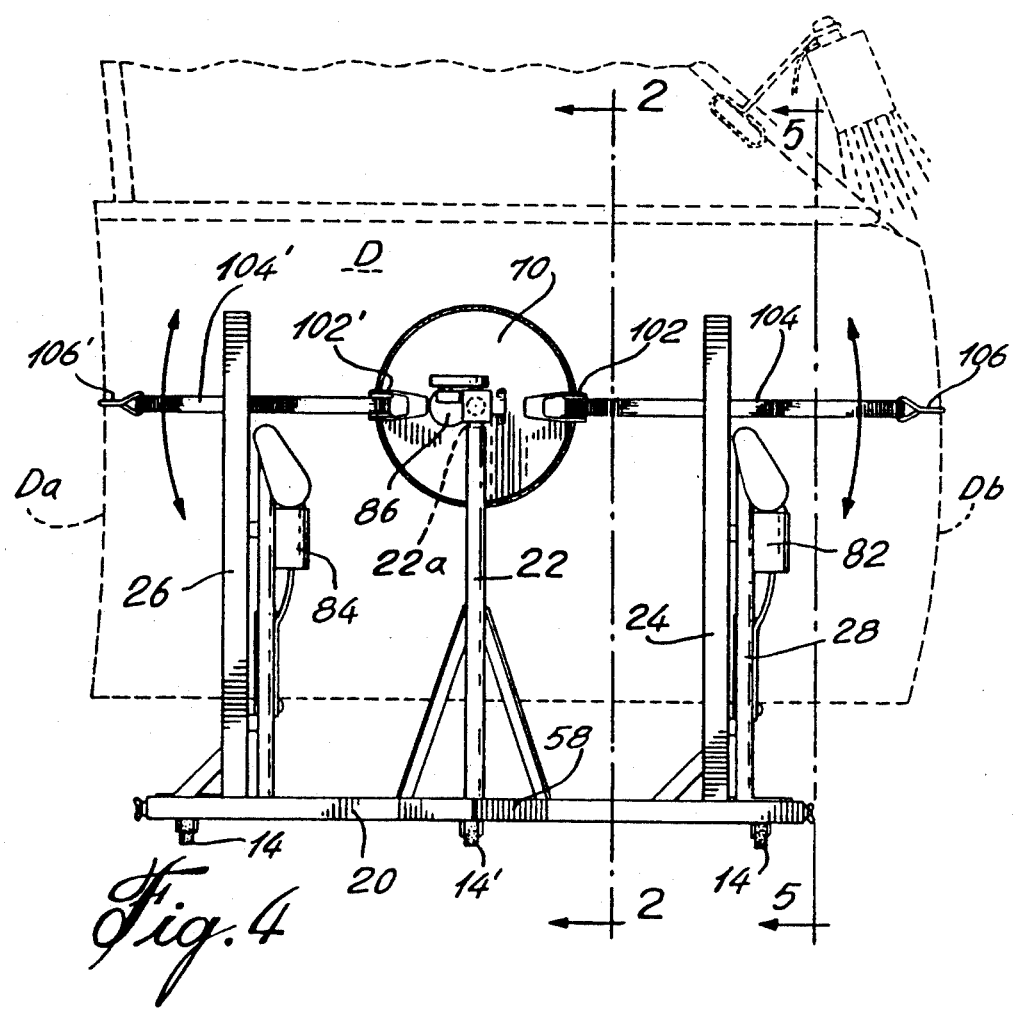
FIG. 4 is a front elevation, at an enlarged scale, of the present door supporting tool, being mounted to a car door shown in phantom lines.

Each motor 82, 84 is actuated to lift each support arm 52, 54 to abut against car part bottom edge Dc, independently of one another accordingly with the relative height of the car door bottom edge Dc on each opposite side portion thereof. By selectively raising or lowering each support arm 52, 54, one can precisely adjust the orientation of the car part in the plane of the latter as shown by the arrows in FIG. 4. By extending or retracting stabilizing arm 64 through operation of motor 86, (see position 64a, FIG. 2), one can precisely obtain the desired laterally tilted position of the car door D or other car body part. Thus, during car door release or installation, the door can be fully supported and held by tool 10 in its precise orientation in two planes and in opened position relative to the car so that a single worker seated in the car can have access to and work on the hinge mounts Dd.

Motors 82-86 must be reversible, for enabling reciprocating motion of corresponding support arms 52, 54 and stabilizing arm 64. Preferably, legs 16, 18 include inturned free end extensions 16a, 18a, to improve ground stability of apparatus 10 in its operative position.

Figure 5:
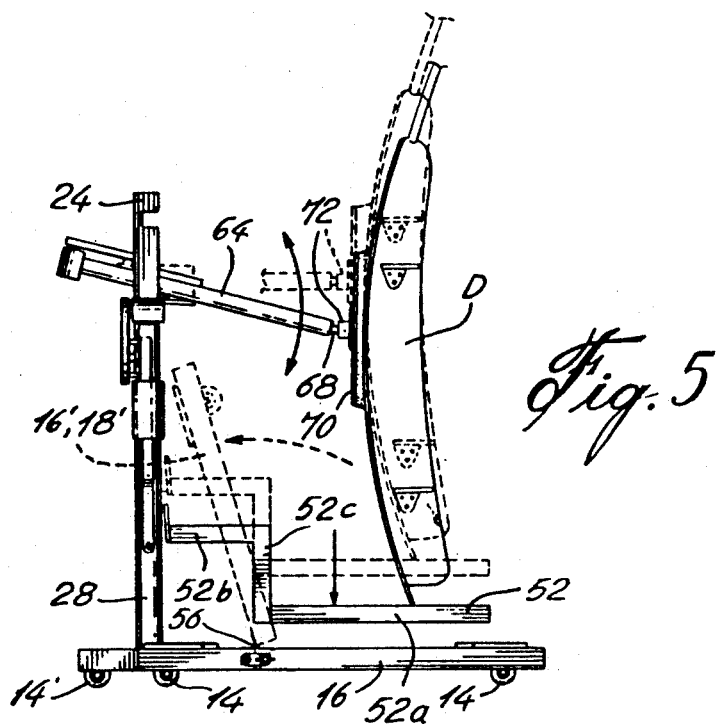
FIG. 5 is a vertical sectional view taken along line 5—5 of FIG. 4.

Preferably, ground legs 16, 18 can be folded up in upright position about hinges 56, relative to web 20, as suggested in phantom lines in FIG. 5 as 16', 18', for facilitating storage of apparatus 10 in restricted storage rooms when not in operation. Legs 16, 18 are locked in extended position by a releasable locking device 56a. Support arms 52, 54 are also foldable upwardly about their horizontal pivot 50, for the same reasons. To stabilize the tool while in folded, storage position, an additional wheel 14' is fitted underneath a triangular block 58 that projects from the intermediate section of bar 20, in a direction opposite legs 16 and 18 in substantial register with central upright post 22. Wheel 14' and the two wheels 14, 14 at the ends of bar 20 form a three point ground contact to support the stacked (folded) apparatus 10 in upright position on the ground.

Figure 2:
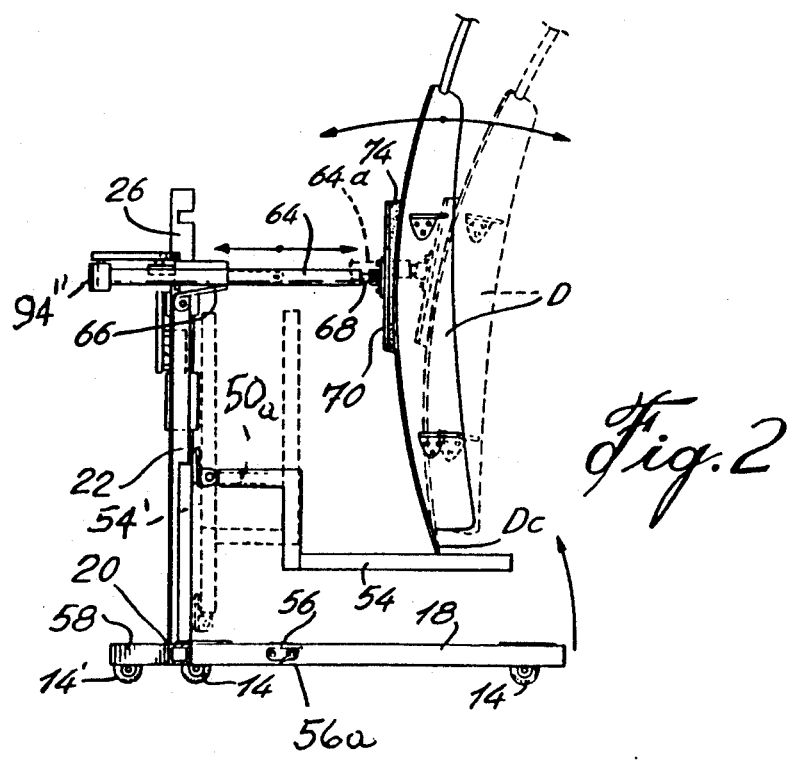
FIG. 2 is a sectional side elevation of the supporting tool and car door of FIG. 1, taken along line 2—2 of FIG. 4, and showing how the door can be adjustably, transversely tilted.
Figure 7:
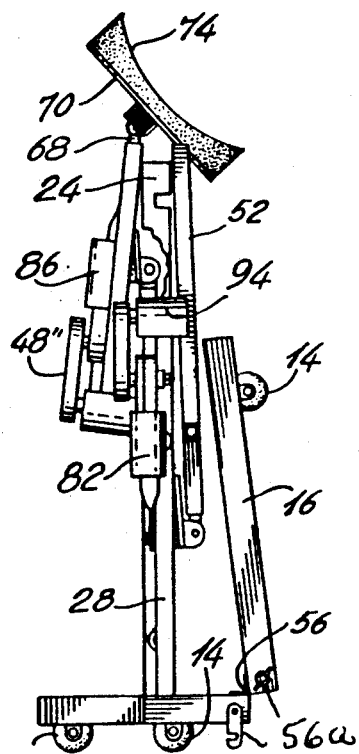
FIG. 7 is a side elevation of the tool in folded storage position.

FIG. 7 shows the fully folded position of tool 10. To obtain this position, the support arms 52, 54, which are made of square tubing are detachably fitted onto a cross-sectionally square nipple 50a which is part of pivot mount 50 (FIG. 2). Support arms 52, 54 are fitted to nipples 50a after having been rotated through 90 degrees whereby they can take the fully stored position shown at 54' in FIG. 2.

I claim:

1. A tool for use in assisting a worker in a vehicle body reblocking workshop in the release or installation of a vehicle body part, comprising:
   a) a ground-movable wheeled base;
   b) three upright posts secured to an upwardly projecting from said base and including first and second posts at the opposite ends thereof and a third intermediate post located therebetween;
   c) first and second power-operated, vertically movable means carried by said first and second posts respectively and independently movable one with respect to the other;
   d) first and second support arms having one end connected to and carried by said first and second vertically-movable means respectively;
   e) a third power-operated horizontally-movable means carried by said third post, a body part stabilizing unit disposed above said support arms and including a stabilizing arm connected to and horizontally movable by said third horizontally-movable means, and an abutment member carried by the free end of said stabilizing arm for abutting a body part; and
   f) securing means carried by said unit for retaining said body part against said abutment member;
   g) said support arms and said stabilizing arm extending over said base and in the same direction relative to said post; said support arms adapted to bodily support said body part by its bottom edge at an adjusted level and orientation in the plane of said body part by selective operation of said first and second power-operated vertically-movable means and said abutment member and securing means are adapted to maintain said body part in an adjusted position transversely of said body part by selective operation of said third power-operated, horizontally-movable means.

2. A tool as in claim 1,
further including a joint means, pivotally interconnecting the outer end of said stabilizing arm and said abutment member, and a pivot means allowing vertical pivoting of said stabilizing arm relative to said intermediate post, for enabling automatic vertical pivoting of said stabilizing arm upon vertical displacement of said body part by said support arms.

3. A tool as in claim 1, further including remote-control means, to selectively operate said first to third power operated-movable means from a common location.

4. A tool as in claim 1,
wherein said securing means include flexible straps having inner end portions adjustably attached by strap tighteners to said abutment member and carrying body part engaging hooks at their outer ends.

5. A tool as in claim 1,
further including first folding means to upwardly pivot said support arms relative to said first and second posts in an upright, inoperative folded position, and second folding means to upwardly pivot a portion of said wheeled base relative to said and posts in an upright, inoperative position, whereby said tool when not in use can be folded and stored into a small storage area.

6. A tool as in claim 2,
wherein said abutment member is a discoid plate having a body part contacting layer of compressible, resilient material.

7. A tool as in claim 1,
wherein each of said first, second and third power operated-movable means includes an electric motor and a nut and screw linear actuator operated by said motor.

8. A tool as claimed in claim 7, wherein said actuator includes a tubular casing wherein said screw is rotatably mounted and axially restrained, said casing having a longitudinal slit, said nut having an ear extending through said slit, driving means interconnecting said motor and screw, the actuator casing of said first and second power operated-movable means being fixed to said first and second posts and the associated actuator nut carrying one of said support arms, the actuator nut of said third power operated-movable means being carried by said third post while the actuator casing of said third power-operated movable means constitutes said stabilizing arm.

9. A tool as in claim 8,
further including securing means to secure said actuator casings of said first and second power operated movable means at different levels on said first and second posts and wherein said third post is telescopic and includes means to adjustably fix its length.

* * * * *